US010286583B2

(12) United States Patent
Ricco'

(10) Patent No.: US 10,286,583 B2
(45) Date of Patent: May 14, 2019

(54) UNIT AND A METHOD FOR CARRYING OUT A FIRST OPERATION AND A SECOND OPERATION ON A WEB

(71) Applicant: TETRA LAVAL HOLDINGS & FINANCE S.A., Pully (CH)

(72) Inventor: Marco Ricco', Spilamberto (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 519 days.

(21) Appl. No.: 14/912,031

(22) PCT Filed: Aug. 1, 2014

(86) PCT No.: PCT/EP2014/066625

§ 371 (c)(1),
(2) Date: Feb. 12, 2016

(87) PCT Pub. No.: WO2015/036169

PCT Pub. Date: Mar. 19, 2015

(65) Prior Publication Data

US 2016/0193798 A1 Jul. 7, 2016

(30) Foreign Application Priority Data

Sep. 13, 2013 (EP) .................................... 13184222

(51) Int. Cl.
*B29C 45/14* (2006.01)
*B29C 45/17* (2006.01)
(Continued)

(52) U.S. Cl.
CPC .......... *B29C 45/1769* (2013.01); *B29C 45/14* (2013.01); *B65H 20/02* (2013.01);
(Continued)

(58) Field of Classification Search
CPC ....... B31B 1/10; B31B 50/102; B31B 50/006; B31B 50/104; B31B 50/10; B31B 50/84;
(Continued)

(56) References Cited

U.S. PATENT DOCUMENTS 2,638,037 A * 5/1953 Knowlton .............. B31B 50/00
112/132
3,044,532 A * 7/1962 Ghisoni .................... B31C 1/00
156/351

(Continued)

FOREIGN PATENT DOCUMENTS

CN 87101608 A 1/1988
CN 1280941 A 1/2001

(Continued)

OTHER PUBLICATIONS

Office Action dated Mar. 28, 2017, by the State Intellectual Property Office of the People's Republic of China in corresponding Chinese Patent Application No. 201480044722.5 and an English Translation of the Office Action. (12 pages)

(Continued)

*Primary Examiner* — Alexander M Valvis
*Assistant Examiner* — Lucas E. A. Palmer
(74) *Attorney, Agent, or Firm* — Buchanan Ingersoll & Rooney PC

(57) ABSTRACT

A unit for carrying out operations on first and second areas of packaging material which are spaced a first distance along direction when a portion of packaging material comprising first and second areas is flat; unit comprising: a feeding group feeding a packaging material web along a direction and in a first sense; a first tool to carry out first operation on first area arranged in a first desired position; a second tool to carry out second operation on second area arranged in a second desired position; first and second tool spaced for a
(Continued)

second distance along direction; feeding group comprises: advancing device controllable to arrest web in a position, at which second area is spaced an intentional offset from second desired position; and an actuator controllable for moving second area towards second desired position to recover offset; absolute value of difference between first and distances being equal to offset.

19 Claims, 7 Drawing Sheets

(51) Int. Cl.

| | |
|---|---|
| ***B65H 20/02*** | (2006.01) |
| ***B65H 20/24*** | (2006.01) |
| ***B65H 23/04*** | (2006.01) |
| ***B65H 23/188*** | (2006.01) |
| *B29L 31/00* | (2006.01) |
| *B31B 50/10* | (2017.01) |
| *B31B 50/84* | (2017.01) |
| *B31B 50/00* | (2017.01) |

(52) U.S. Cl.
CPC .......... *B65H 20/24* (2013.01); *B65H 23/048* (2013.01); *B65H 23/1884* (2013.01); *B29L 2031/7162* (2013.01); *B31B 50/006* (2017.08); *B31B 50/10* (2017.08); *B31B 50/102* (2017.08); *B31B 50/104* (2017.08); *B31B 50/84* (2017.08); *B65H 2402/341* (2013.01); *B65H 2511/112* (2013.01)

(58) Field of Classification Search
CPC ..... B31B 2203/003; B31B 7/00; B31B 19/10; B31B 2203/082; B31B 2217/0076; B29C 45/1769; B65H 20/02; B65H 20/24; B65H 23/048; B65H 23/1884; B65H 2402/341; B65H 2511/112; B29L 2031/7162
USPC .................................... 493/29, 81, 180, 197
See application file for complete search history.

(56) References Cited

U.S. PATENT DOCUMENTS 3,087,393 A * 4/1963 Pottle ........................ B31C 3/00 112/2
3,126,431 A * 3/1964 Harder et al. .......... B65B 41/18 264/292
3,556,510 A * 1/1971 Treff .................. B65H 23/1886 226/25
3,652,363 A * 3/1972 Kinslow, Jr. ............ B29C 66/98 156/355
3,861,983 A * 1/1975 Harrell .................... B29C 65/02 156/359
3,905,533 A * 9/1975 Corse ..................... B65H 23/16 226/44
4,604,083 A * 8/1986 Barny ..................... B31B 50/00 493/28
4,708,301 A * 11/1987 Kataoka ................. B65H 20/16 226/44
4,759,741 A * 7/1988 Chisholm, Jr. .......... B65H 5/34 493/181
4,782,987 A * 11/1988 Giacomelli ............. B65B 41/18 226/2
4,846,915 A * 7/1989 Keeler .................... B29C 65/78 156/261
4,847,775 A * 7/1989 Roch ..................... B41F 13/025 700/125
5,011,722 A * 4/1991 Chung ................... B65D 5/065 229/208
5,150,560 A * 9/1992 Crowley ................ B43M 3/045 53/131.5
5,383,392 A * 1/1995 Kowalewski ........... B41F 19/00 101/183
RE35,067 E * 10/1995 Bauknecht ............... B26D 5/00 226/32
5,711,470 A * 1/1998 Thompson ......... B65H 23/0326 226/16
5,733,236 A * 3/1998 De Smedt ............... B31B 70/00 493/11
5,803,888 A * 9/1998 Severs .................... B29C 65/78 226/173
5,927,196 A * 7/1999 Murray ................... B41F 13/02 101/219
6,024,683 A * 2/2000 Wilkes ................... B26D 1/626 493/196
6,136,261 A * 10/2000 Wakabayashi ......... G03B 17/26 264/153
6,303,066 B1 * 10/2001 Gustafsson ....... B29C 45/14344 264/267
6,386,851 B1 * 5/2002 Gustafsson ............ B65B 41/18 226/2
6,508,173 B1 * 1/2003 Focke ..................... B65B 41/18 101/228
6,773,384 B2 * 8/2004 Guiot ...................... B31B 50/00 493/10
6,820,399 B2 * 11/2004 Send ....................... B65B 41/18 493/10
9,044,974 B1 * 6/2015 Mo ......................... B41J 15/04
9,914,590 B2 * 3/2018 Akiyama ............... B65G 13/06
2002/0000143 A1 * 1/2002 Okonski .................. B26D 7/22 83/72
2002/0088202 A1 7/2002 Van Rens et al.
2004/0038789 A1 * 2/2004 Succi ...................... B65B 41/18 493/29
2004/0074407 A1 * 4/2004 Iyokawa ................ B41F 13/02 101/228
2005/0034578 A1 * 2/2005 Brandenburg ........ B41F 13/025 83/13
2005/0039622 A1 * 2/2005 Brandenburg ........ B41F 13/025 101/485
2005/0061189 A1 * 3/2005 Brandenburg ........ B41F 13/025 101/485
2006/0054670 A1 * 3/2006 Focke ................... B65B 61/182 229/87.13
2006/0284329 A1 12/2006 Harnfeldt et al.
2009/0108522 A1 * 4/2009 Kato ....................... B21C 47/34 271/273
2010/0016137 A1 * 1/2010 Benedetti ................ B65B 41/16 493/162
2010/0108471 A1 * 5/2010 Vallee ...................... B65H 5/16 198/717
2010/0210436 A1 * 8/2010 Taketsugu .............. B65H 29/62 493/29
2011/0150548 A1 * 6/2011 Kasuga .................. B65H 5/062 399/388
2012/0067953 A1 * 3/2012 Nilsson ..................... B31B 1/88 235/449
2012/0272619 A1 * 11/2012 Tavernari ................ B65B 41/18 53/412
2014/0291375 A1 * 10/2014 Mashima ............... B65H 20/02 226/176
2017/0015515 A1 * 1/2017 Suzuki ................... B21D 43/09
2017/0247215 A1 * 8/2017 Oda ....................... B65H 20/02

FOREIGN PATENT DOCUMENTS

| | | | |
|---|---|---|---|
| CN | 1306934 | A | 8/2001 |
| CN | 1852835 | A | 10/2006 |
| CN | 201046779 | Y | 4/2008 |
| EP | 2 357 138 | A1 | 8/2011 |
| JP | 07187109 | A | 7/1995 |
| JP | 2004-106431 | A | 4/2004 |

(56) References Cited

FOREIGN PATENT DOCUMENTS

| | | | |
|---|---|---|---|
| JP | 2011241011 | A | 12/2011 |
| JP | 2011245730 | A | 12/2011 |

OTHER PUBLICATIONS

International Search Report (PCT/ISA/210) dated Nov. 7, 2014, by the European Patent Office as the International Searching Authority for International Application No. PCT/EP2014/066625.
Written Opinion (PCT/ISA/237) dated Nov. 7, 2014, by the European Patent Office as the International Searching Authority for International Application No. PCT/EP2014/066625.
Japanese Office Action dated May 28, 2018 issued by the Japanese Patent Office in corresponding Japanese Patent Application No. 2016-541854, with English translation (7 pages).

* cited by examiner

UNIT AND A METHOD FOR CARRYING OUT A FIRST OPERATION AND A SECOND OPERATION ON A WEB

TECHNICAL FIELD

The present invention relates to a unit for carrying out a first operation and a second operation respectively onto a first area and a second area of a packaging material.

The present invention also relates to a method for carrying out a first operation and a second operation respectively onto a first area and a second area of a packaging material.

BACKGROUND OF INVENTION

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material, and a number of lamination layers of heat-seal plastic material, e.g. polyethylene films, covering both sides of the base layer.

In the case of aseptic packages for long-storage products, such as UHT milk, the packaging material also comprises a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

To open the packages described above, various solutions of opening devices have been proposed.

A first solution of opening device comprises a patch defined by a small sheet of a heat-seal plastic material, and which is heat sealed over a respective hole on the side of the web eventually forming the inside of the package; and a pull-off tab applied to the opposite side of the packaging material and heat sealed to the patch. The tab and patch adhere to each other, so that, when the tab is pulled off, the portion of the patch heat sealed to it is also removed to uncover the hole.

Alternatively, a second solution of the opening devices comprises closable opening devices which are applied by injecting plastic material directly onto the holes of the web. In this case, the application station is a molding station.

Finally, a third solution of opening device comprises a frame defining an opening and fitted about a pierceable or removable portion of the packaging material.

The pierceable portion of the package may be defined by a so-called "prelaminated" hole, i.e. a hole formed in the base layer only and covered by the other lamination layers, including the layer of gas-barrier material. Also in this case, the application station is a molding station.

More precisely, the web is provided with a plurality of prelaminated holes in a packaging material factory and then fed to the packaging machine.

The web is then wound off from a reel within the packaging machine. Subsequently, the web is stepwise fed to the application station before the packaging material is folded to form a tube. In particular, the web is fed towards the molding station along an advancing direction.

The molding of opening devices at the molding station requires that pre-laminated holes are arrested in respective desired positions relative to the molding station.

In particular, the desired position is required for a correct molding of the opening device at the molding station.

EP-A-2357138, in the name of the same Applicant, discloses a unit for applying opening devices onto respective pre-laminated holes, substantially comprising:

- a tensioning device for establishing a correct level of tension in the web of packaging material with the pre-laminated holes, which advances along an advancing direction;
- the molding station, which is stepwise fed with the web by the feeding device and is adapted to injection mould a plurality of opening devices onto the web and in correspondence of respective pre-laminated holes of the web; and
- an advancing device, which is arranged downstream of the molding station according to the advancing sense of the web along the advancing direction and adapted to advance the web along the advancing direction.

In particular, the advancing device stepwise feeds one after the other and along the advancing direction a plurality of portions of the web each comprising three opening devices towards the molding station.

The molding station comprises a plurality, three in the known solution, of moulds, which inject the plastic material forming the opening devices onto the web and in correspondence of respective pre-laminated holes.

Furthermore, the pre-laminated holes are associated to respective magnetic markers.

In order to adjust the position of the pre-laminated holes with respect to relative moulds, the unit comprises a magnetic sensor for detecting the presence of markers while the web is advancing and generating respective measure signals associated to the real positions of the pre-laminated holes.

Still more precisely, the additional displacement along the advancing direction is associated to the difference between the detected position and the desired position of only one, namely the intermediate one, pre-laminated hole.

Even if the previously described known solution efficiently adjusts the position of the pre-laminated holes relative to the moulds, an increase in the number of the moulds remains highly desirable, in order to correspondingly increase the rate of application of the opening devices.

However, the known solution allows to correctly positioning in the desired position along the advancing direction only one reference pre-laminated hole with respect to relative mould, in particular the intermediate pre-laminated hole.

The remaining pre-laminated holes will not be arranged in the respective desired positions with respect to relative moulds. This is because, there are inevitable tolerance errors in the distance between homologous points, e.g. the axes, of the remaining pre-laminated holes and of the reference pre-laminated hole.

Unfortunately, the higher are the number of the moulds, the longer is the tolerance chain formed by the inevitable errors in the distances between homologous points, e.g. between the axes, of the reference pre-laminated hole and the remaining pre-laminated holes.

Accordingly, in the known solution, an increase in the number of moulds inevitably affects the precision in the positioning of the remaining pre-laminated holes with respect to the corresponding desired position and therefore to the respective moulds.

A need is therefore felt within the industry to increase the number of moulds without lengthen the tolerance chain formed by the inevitable errors in the distances between homologous points of the pre-laminated holes and, therefore, without affecting the precision in the final positioning of the pre-laminated holes with respect to the corresponding desired positions, and therefore, to the respective moulds.

Still in broader terms, a need is felt within the industry, when a plurality of operations must be carried out at desired positions onto respective areas of a web of packaging material, to increase the number of tools which carry out the operations, without lengthen the tolerance chain formed by the inevitable errors in the distances between homologous points of two areas and, therefore, without affecting the precision in the final positioning with respect to the corresponding desired position and, therefore, with respect to the tools.

DISCLOSURE OF INVENTION

It is an object of the present invention to provide a unit for carrying out a first operation and a second operation respectively onto a first area and a second area of a packaging material, designed to meet at least one of the above-identified requirement.

According to the present invention, there is provided a unit for carrying out a first operation and a second operation respectively onto a first area and a second area of a packaging material, as claimed in claim 1.

The present invention also relates to a method for carrying out a first operation and a second operation respectively onto a first area and a second area of a packaging material, as claimed in claim 9.

BRIEF DESCRIPTION OF THE DRAWINGS

A preferred, non-limiting embodiment of the present invention will be described by way of example with reference to the accompanying drawings, in which.

DETAILED DESCRIPTION OF PREFERRED EMBODIMENTS

Figure 1:
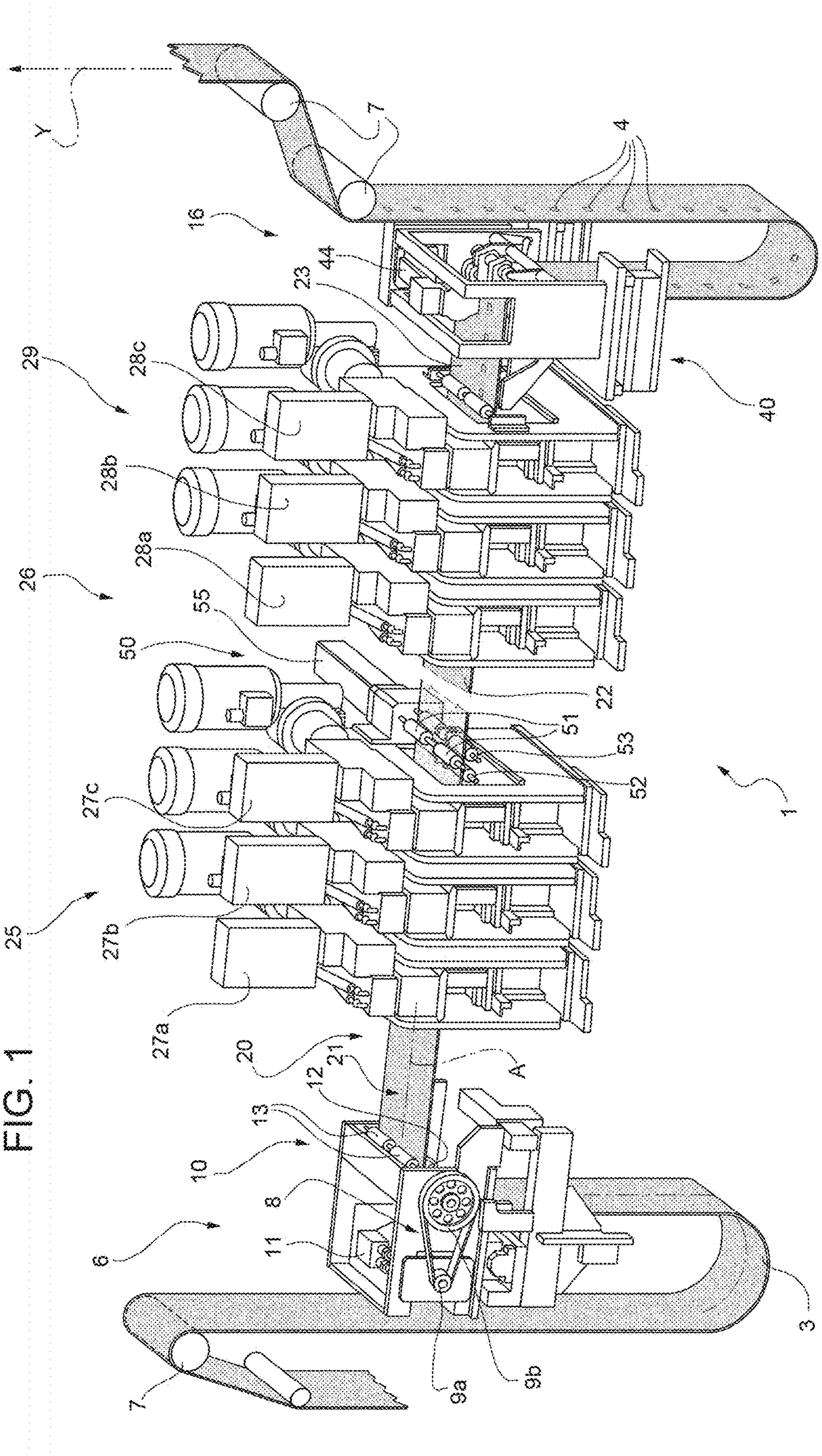
FIG. 1 shows a perspective view of a unit for molding a plurality of opening devices onto respective pre-laminated holes of a web of a packaging material, according to the present invention.

Number 1 in FIG. 1 indicates as a whole a unit for molding a plurality of opening devices 4 onto respective pre-laminated holes of a web 3 of a packaging material.

Packaging material is intended to form a plurality of packages, which preferably contain a pourable food product, such as pasteurized or UHT milk, fruit juice, wine, etc.

Packages may also contain a food product, which is pourable within a tube of packaging material when producing packages, and sets after packages are sealed. One example of such a food product is a portion of cheese, which is melted when producing packages and sets after packages are sealed.

The tube is formed in known manner downstream from unit 1 by longitudinally folding and sealing a known web 3 of heat-seal sheet material, which comprises a layer of paper material covered on both sides with layers of heat-seal plastic material, e.g. polyethylene. In the case of an aseptic package for long-storage products, such as UHT milk, the packaging material comprises a layer of oxygen-barrier material, e.g. aluminium foil, which is superimposed on one or more layers of heat-seal plastic material eventually forming the inner face of package contacting the food product.

The tube of packaging material is then filled with the food product for packaging, and is sealed and cut along equally spaced cross sections to form a number of pillow packs (not shown), which are then transferred to a folding unit where they are folded mechanically to form respective packages.

A first solution of opening device 4 comprises a patch defined by a small sheet of a heat-seal plastic material, and which is heat sealed over a respective hole on the side of the web eventually forming the inside of the package; and a pull-off tab applied to the opposite side of the packaging material and heat sealed to the patch. The tab and patch adhere to each other, so that, when the tab is pulled off, the portion of the patch heat sealed to it is also removed to uncover the hole.

Alternatively, a second solution comprises closable opening devices 4 which are applied by injecting plastic material directly onto the holes of the web 3.

In a third solution, web 3 comprises a number of removable portions (only schematically shown in FIGS. 5 and 6) equally spaced, except for the inevitable tolerance errors, in a lengthwise direction A parallel to an advancing path Y of the packaging material, and to which opening devices 4 are injection molded.

In the embodiment shown, the removable portion is defined by a so-called pre-laminated hole **2*a*, 2*b*, 2*c*, 2*d*, 2*e*, 2*f***, i.e. a hole (or opening) formed through the base layer of packaging material and covered by the lamination layers so that the hole is sealed by a respective sheet cover portion.

Figure 7:
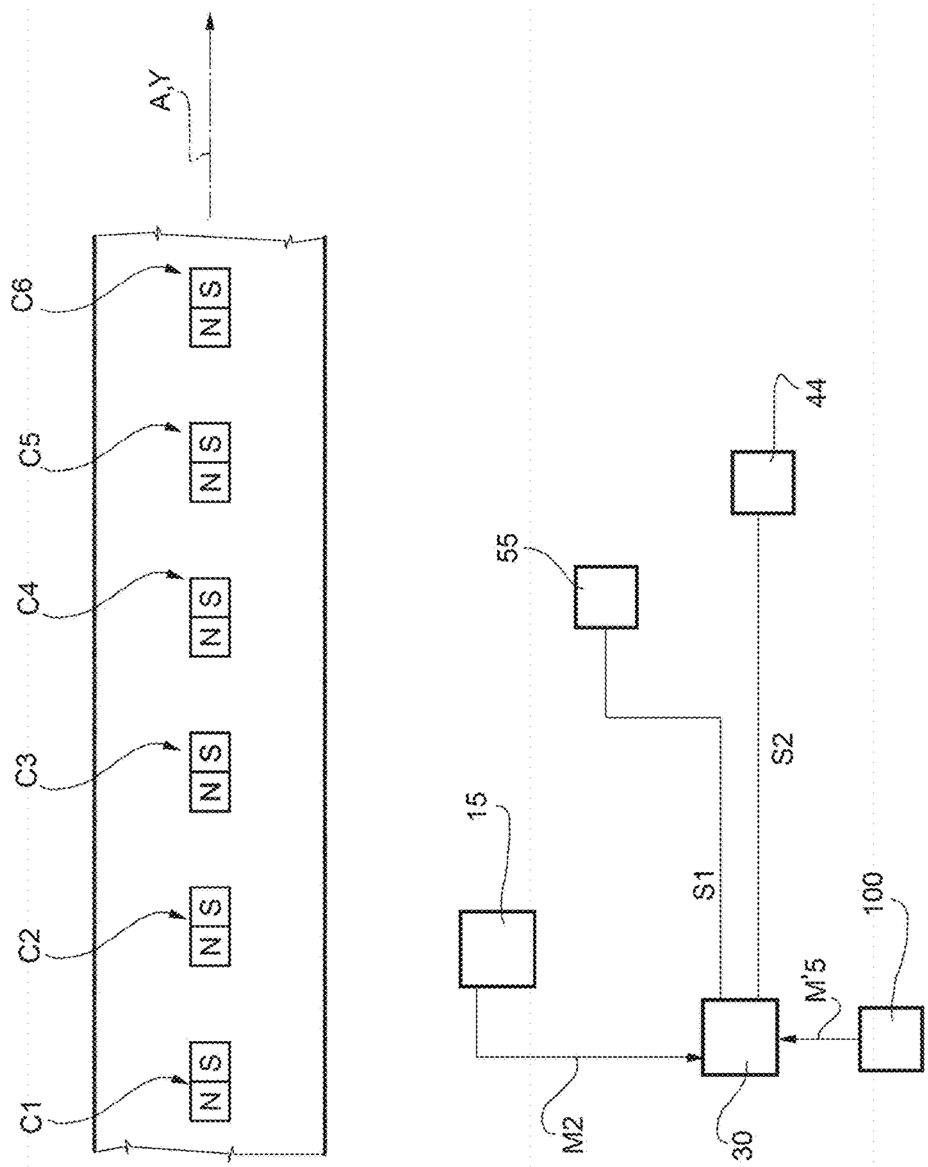
FIG. 7 schematically shows further components of the feeding group of FIGS. 1 to 6.

Web 3 finally comprises a plurality of magnetic markers C1, C2, C3, C4, C5, C6 (shown in FIG. 7 for sake of clarity, but not visible in reality).

More precisely, the positions of pre-laminated holes 2*a*, 2*b*, 2*c*, 2*d*, 2*e*, 2*f* are associated respectively to the positions of magnetic markers C1, C2, C3, C4, C5, C6.

In the embodiment shown, magnetic markers C1, C2, C3, C4, C5, C6 are printed with a magnetizable ink which has been subsequently magnetized. More precisely, each magnetic marker C1, C2, C3, C4, C5, C6 has respective north and south poles aligned along path Y.

Magnetic markers C1, C2, C3, C4, C5, C6 are applied to web 3 in alignment with pre-laminated holes 2*a*, 2*b*, 2*c*, 2*d*, 2*e*, 2*f*.

Unit 1 substantially comprises (FIG. 1):

- a feeding group 6 arranged downstream of the reel and adapted to stepwise feed web 3 along direction A; and
- a molding station 26 stepwise fed with web 3 by group 6 and adapted to injection mould opening devices 4 onto web 3 and at respective pre-laminated holes 2*a*, 2*b*, 2*c*, 2*d*, 2*e*, 2*f*, of web 3.

More precisely, group 6 stepwise feeds one after the other a plurality of portions 20 of web 3 each comprising a certain number of pre-laminated holes 2*a*, 2*b*, 2*c*, 2*d*, 2*e*, 2*f*, six in the embodiment shown, towards molding station 26.

In particular, portion 20 extends along direction A, when it is arrested under molding station 26.

In detail, each portion 20 comprises, in turn, proceeding along direction A and according to advancing sense of web 3 indicated by the arrow in FIGS. 1 to 7:

- a stretch 21 comprising a first group, three in the embodiment shown, of pre-laminated holes 2*a*, 2*b*, 2*c;*
- a stretch 22; and
- a stretch 23 comprising a second group, three in the embodiment shown, of pre-laminated holes 2*d*, 2*e*, 2*f*.

Molding station 26 comprises, in turn, proceeding along direction A and according to advancing direction of web 3:

- a group 25 of moulds 27*a*, 27*b*, 27*c*, three in the embodiment shown, which inject the plastic material forming respective opening devices 4 onto web 3 and at respective pre-laminate holes 2*a*, 2*b*, 2*c*, once portion 20 has been arrested by feeding group 6; and
- a group 29 of moulds 28*a*, 28*b*, 28*c*, three in the embodiment shown, which inject the plastic material forming respective opening devices 4 onto web 3 and at respective pre-laminate holes 2*d*, 2*e*, 2*f*, once portion 20 has been arrested by feeding group 6.

Figure 5:
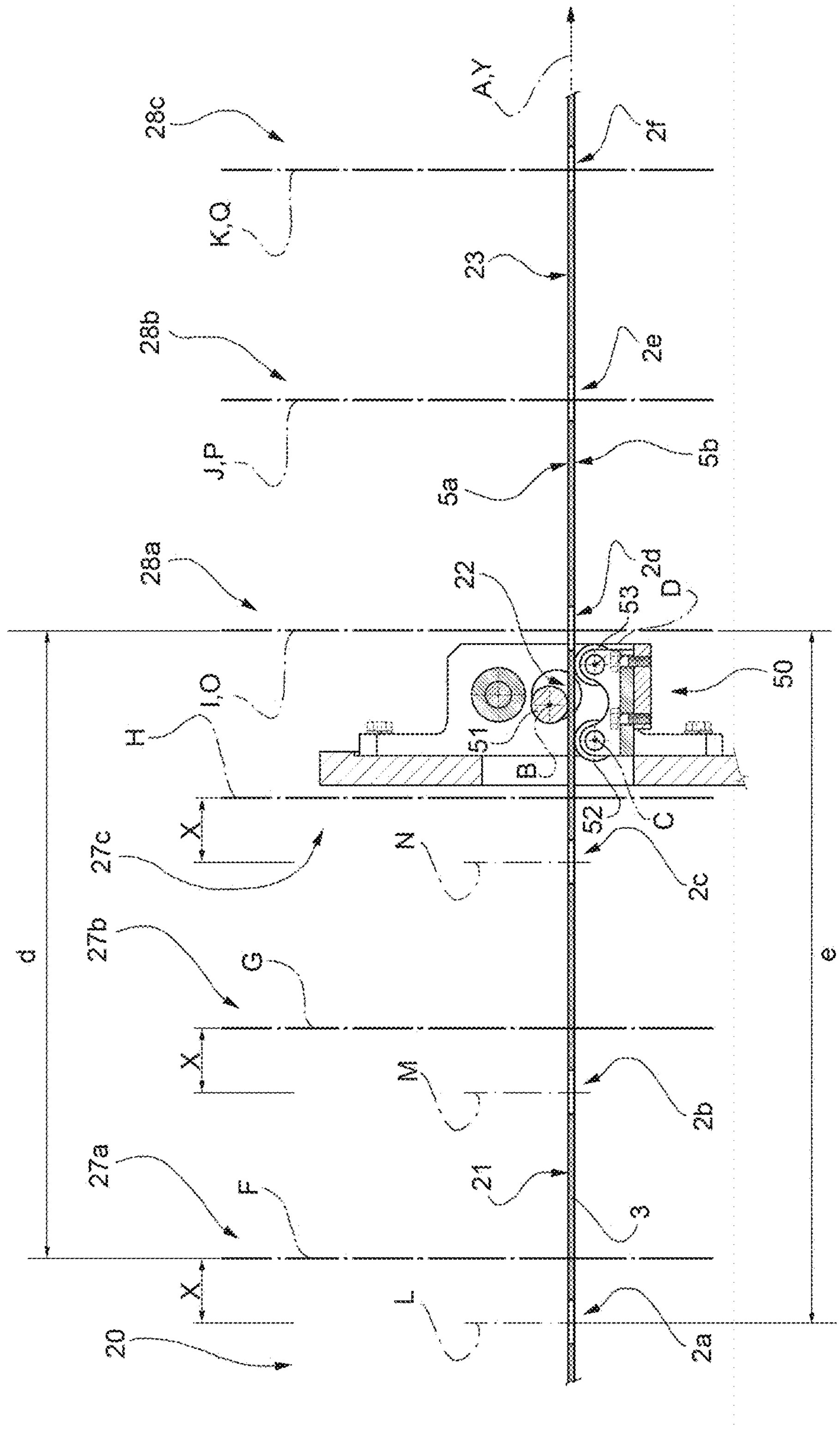
FIG. 5 is a frontal view of the feeding group of FIGS. 1 to 4 in the first position.
Figure 6:
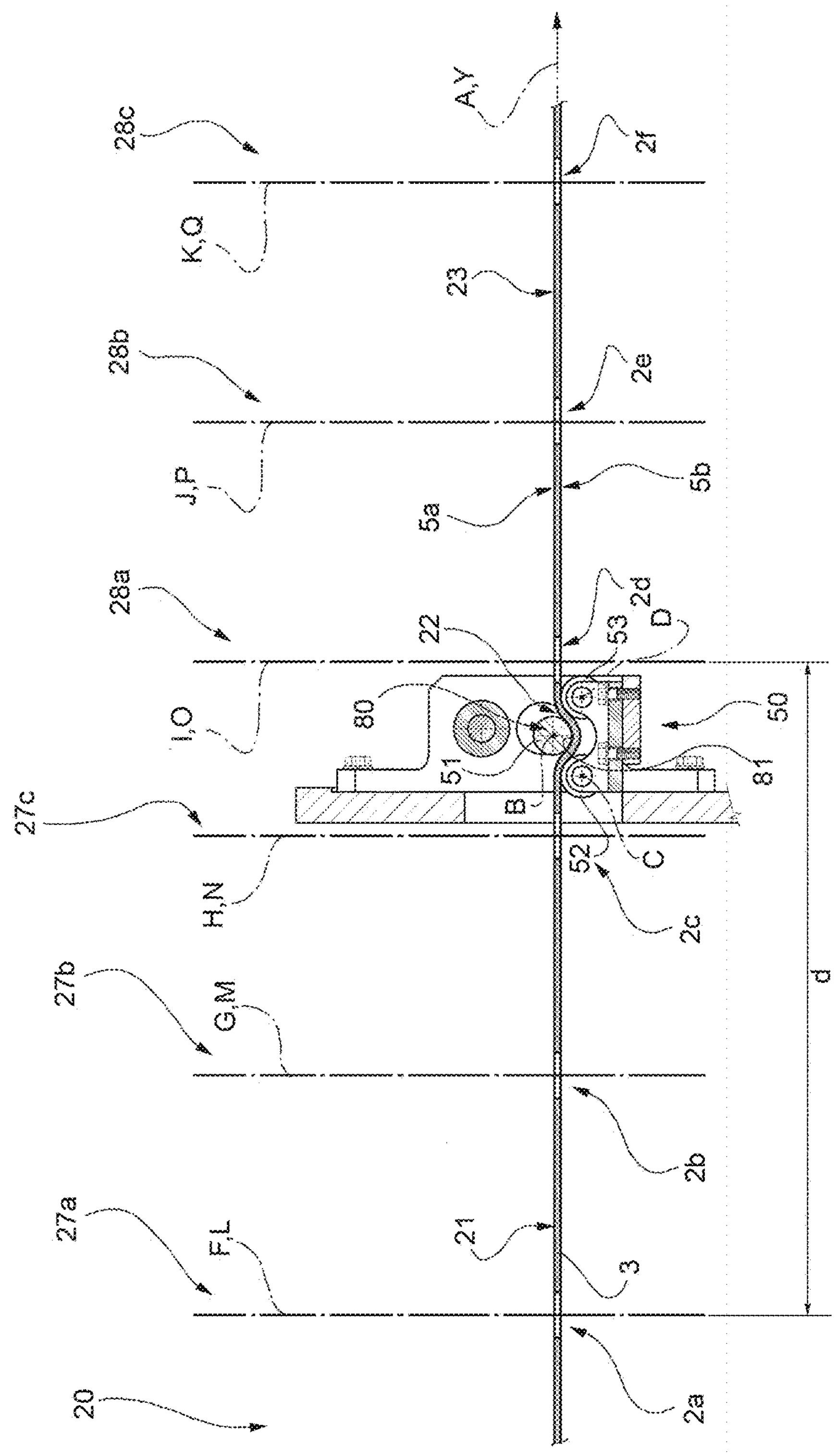
FIG. 6 is a frontal view of the feeding group of FIGS. 1 to 5 in the second position.

Each mould 27*a*, 27*b*, 27*c*, 28*a*, 28*b*, 28*c* is adapted to inject a respective opening device 4 onto a respective pre-laminated hole 2*a*, 2*b*, 2*c*, 2*d*, 2*e*, 2*f*, about a relative axis F, G, H, I, J, K, when portion 20 of web 3 is arrested (FIGS. 5 and 6).

In other words, each axis F, G, H, I, J, K is the reference axis of respective injected opening devices 4.

Axes F, G, H, I, J, K are orthogonal to direction A and web 3 and, in the embodiment shown, vertical.

In the embodiment shown, the distance between axes F, I; G, J; H, K measured parallel to direction A equals length d (FIG. 5).

Furthermore, each pre-laminated hole 2*a*, 2*b*, 2*c*, 2*d*, 2*e*, 2*f*, is associated to an axis L, M, N, O, P, Q (FIGS. 5 and 6) about which respective opening device 4 should be ideally injected.

For each pre-laminated holes 2*a*, 2*b*, 2*c*, 2*d*, 2*e*, 2*f*, it is therefore possible to identify a respective desired injection position at which respective axes L, M, N, O, P, Q coincide with corresponding axes F, G, H, I, J, K.

It is important to point out that due to the inevitable tolerance errors existing in the distance measured parallel to direction A between axes L, M, N, O, P, Q, it is not possible to simultaneously arrange all pre-laminated holes 2*a*, 2*b*, 2*c*, 2*d*, 2*e*, 2*f*, in respective desired injection positions, as it will be apparent from the following of the present description.

In the embodiment shown, pre-laminated holes 2*a*, 2*b*, 2*c*, 2*d*, 2*e*, 2*f*, are equi-spaced along direction A.

In other words, the distances between consecutive axes L, M; M, N; N, O; O, P; P, Q measured parallel to direction A are equal.

Feeding group 6 comprises, in turn, proceeding parallel to advancing sense of web 3 parallel to direction A (FIG. 1):

- a device 10 arranged downstream from the reel and adapted to create a tension in web 3 along direction A; and
- a device 16 arranged downstream from the molding station 26 along path Y and adapted to advance web 3 along direction A in the sense indicate by the arrow in FIG. 1.

Unit 1 also comprises a plurality of idler rollers 7 which are arranged upstream from device 10 and downstream from device 16 and are adapted to support web 3 while it advances along path Y.

In greater detail, device 10 comprises (FIG. 1):

- a motor 11 for providing web 3 with the correct level of tension;
- a plurality of rollers 12 and counter-rollers (not shown) for guiding web 3 along direction A;
- a pair of rollers 13 for damping the oscillations of web 3 in a vertical plane.

Device 10 further comprises:

- a magnetic sensor 15 (schematically shown in FIG. 7) arranged upstream of moulding station 26 with reference to the advancing sense of web 3, and adapted to detect the real positions of magnetic markers C1, C2, C3, C4, C5, C6 upstream of moulding station 26 and to generate respective measure signals M1, M2, M3, M4, M5, M6 associated to the real position of pre-laminated holes 2*a*, 2*b*, 2*c*, 2*d*, 2*e*, 2*f*, detected, through the respective magnetic markers C1, C2, C3, C4, C5, C6, upstream of moulding station 26; and
- a magnetic sensor 100 (schematically shown in FIG. 7) interposed between moulds 28*a*, 28*b*, and adapted to detect the positions of magnetic markers C1, C2, C3, C4, C5, C6 between moulds 28*a*, 28*b* and to generate respective measure signals M1', M2', M3', M4', M5', M6' associated to the real position of pre-laminated holes 2*a*, 2*b*, 2*c*, 2*d*, 2*e*, 2*f*, detected, through the respective magnetic markers C1, C2, C3, C4, C5, C6, between moulds 28*a*, 28*b*.

Motor 11 exerts an action on web 3 opposite to the action exerted by device 16, so as to provide web 3 with the correct level of tension along direction A.

Roller 12 is driven in rotation by motor 11 through the interposition of a belt 8. More precisely, belt 8 is wound onto a pulley 9*a* driven in rotation by motor 11 and a pulley 9*b* which drives in rotation roller 12.

Roller 12 and corresponding counter-roller cooperate with opposite sides of web 3 which is being advanced towards molding station 26.

Sensor 15, in the embodiment shown, detects the transition between respective north and south pole of magnetic markers C1, C2, C3, C4, C5, C6, so detecting the positions of magnetic markers C1, C2, C3, C4, C5, C6 and, therefore, the positions of relative pre-laminated holes 2*a*, 2*b*, 2*c*, 2*d*, 2*e*, 2*f*, along direction A.

Sensors 15, 100 generate measure signals M1, M2, M3, M4, M5, M6; M1', M2', M3', M4', M5', M6' which are associated to the real positions of pre-laminated holes 2*a*, 2*b*, 2*c*, 2*d*, 2*e*, 2*f*, corresponding to the positions of respective magnetic markers C1, C2, C3, C4, C5, C6 along direction A and upstream of moulding station 26 and between moulds 28*a*, 28*b* respectively.

Device 16 comprises:

a fixed frame 40; and a motor 44 (shown in FIG. 1) fitted to frame 40 and adapted to step-wise advance web 3 along direction A and on the opposite side of molding station 26.

Advantageously, motor 44 of device 16 is controllable to arrest web 3 in a position, at which the distance between axes L, O; M, P; N, Q measured parallel to direction A equals length e (FIG. 5), and at which pre-laminated holes 2*a*, 2*b*, 2*c* are spaced for an intentional offset X (FIG. 5) with respect to the respective desired injection positions; and group 6 further comprises an actuator 50 controllable for moving pre-laminated holes 2*a*, 2*b*, 2*c* towards the respective desired injection positions, so as to recover offset X; the absolute value of the difference between length e and length d is equal to offset X.

In other words, motor 44 is controllable to arrest portion 20 of web 3 in a position, at which the distance between axis F, G, H of pre-laminated holes 2*a*, 2*b*, 2*c* and respective axis L, M, N of corresponding moulds 27*a*, 27*b*, 27*c* equals intentional offset X measured parallel to direction A (FIG. 5), except for the inevitable tolerance errors existing in the distances between axes L, M; M, N.

It is important to point out that the expression intentional offset is used to indicate a distance intentionally left by feeding group 6 between axis L, M, N and relative axis F, G, H.

In this respect, intentional offset X is different from the inevitable tolerance errors (not shown in FIGS. 5 and 6) existing in the distances between axis L, M; M, N; N, O.

In particular, the value of offset X is far greater than the inevitable tolerance errors existing in the distances between axis L, M; M, N; N, O of pre-laminated holes 2*a*, 2*b*, 2*c*.

Furthermore, length e is measured when portion 20 is flat and wholly lies on a plane parallel to direction A.

In the embodiment shown, length e is greater than length d.

In particular, length e is not an integer multiple of length d.

In the embodiment shown, length e is an integer multiple of the distance between axes L, M; M, N; N, O; O, P; P, Q of two consecutive pre-laminated holes 2*a*, 2*b*; 2*b*, 2*c*; 2*c*, 2*d*; 2*d*, 2*e*; 2*e*, 2*f*; whilst length d is not an integer multiple of the distance between axes L, M; M, N; N, O; O, P; P, Q of two consecutive pre-laminated holes 2*a*, 2*b*; 2*b*, 2*c*; 2*c*, 2*d*; 2*d*, 2*e*; 2*e*, 2*f*.

It is important to point out that lengths e, d are in the present description nominal length, which are measured without taking into account the inevitable tolerances.

Still more precisely, when portion 20 is arrested, pre-laminated holes 2*a*, 2*b*, 2*c* are arranged upstream of respective desired injection position, proceeding according to the advancing sense of web 3 along direction A.

In other words, when portion 20 is arrested, axes L, M, N of respective pre-laminated holes 2*a*, 2*b*, 2*c* are upstream of axes F, G, H of respective moulds 27*a*, 27*b*, 27*c*, proceeding according to the advancing sense of web 3 along direction A.

Furthermore, motor 44 is controllable to arrest web 3 with pre-laminated holes 2*d*, 2*e*, 2*f*, substantially with no intentional offset with respect to the desired injection positions of application of respective opening devices 4.

Still more precisely, as it will be evident in the following of the present description, motor 44 is controllable to arrest portion 20 in such a position that axis J of pre-laminated holes 2*e*, coincide with axis P of respective mould 28*b* and is, therefore, in the desired injection position.

Accordingly, the positions of axes O, Q of pre-laminated holes 2*d*, 2*f*, with respect to relative axes I, K of respective moulds 28*a*, 28*c* are determined by the positioning of pre-laminated hole 2*e*, in the desired injection position.

In light of the above, pre-laminated holes 2*d*, 2*f* may be slightly spaced along direction A from respective desired injection positions, as a consequence of the inevitable tolerance errors existing in the distance between axes O, P and P, Q.

In particular, once portion 20 has been arrested, the distance between axis O of pre-laminated hole 2*d* and axis I of mould 28*a* equals the inevitable tolerance error existing in the distance between axes O, P.

In the very same way, once portion 20 has been arrested, the distance between axis Q of pre-laminated hole 2*f*, and axis K of mould 28*c* equals the inevitable tolerance error existing in the distance between axes Q, P.

Due to the fact that these inevitable tolerance errors can be neglected, they are not visible in FIGS. 5 and 6.

With reference to FIG. 6, actuator 50 is controllable to move pre-laminated hole 2*b* exactly in the respective desired injection position along direction A and in the same sense of the advancing sense of web 3, before the injection of respective opening devices 4.

In other words, actuator 50 is controllable to move web 3 so as to render axis M of pre-laminated hole 2*b* and axis G of mould 27*b* coincident with one another, and recover offset X also of pre-laminated holes 2*a*, 2*c*.

Accordingly, the positions of axes L, N of pre-laminated holes 2*a*, 2*c* with respect to relative axes F, H of moulds 27*a*, 27*c* are determined by the positioning of pre-laminated hole 2*b* in the desired injection position.

In particular, actuator 50 is controllable to arrest web 3 in a position at which the distance between axis L of pre-laminated hole 2*a* and axis F of mould 27*a*, equals the inevitable tolerance error existing in the distance between axes L, M.

In the very same way, actuator 50 is controllable to arrest web 3 in a position at which the distance between axis N of pre-laminated hole 2*c* and axis H of mould 27*c* equals the inevitable tolerance error existing in the distance between axes N, L.

Furthermore, actuator 50 is controllable to substantially leave pre-laminated holes 2*d*, 2*e*, 2*f*, in the respective position, once web 3 has been arrested and before the injection of respective opening devices 4.

In this way, pre-laminated hole 2*e*, remains in the respective desired injection position with respect to mould 28*b* whereas the pre-laminated holes 2*d*, 2*f*, remains spaced from the respective desired injection positions only by the inevitable tolerance errors existing in the distance between axes O, P and P, Q respectively.

In greater detail, actuator 50 is interposed along direction A between moulds 27*a*, 27*b*, 27*c* and moulds 28*a*, 28*b*, 28*c*.

Actuator 50 substantially comprises (FIGS. 4 to 6):

a frame 46;

a pair of rollers 51, which are arranged on a side 5*a* of web 3, cooperate with stretch 22 of portion 20, and eccentrically rotate about a common axis B orthogonal to direction A and horizontal, in the embodiment shown;

a pair of rollers 52, which are arranged on a side 5*b* of web 3, cooperate with stretch 22 of portion 20, and rotate about a common axis C; and a pair of rollers 53, which are arranged on side 5*b* of web 3, cooperate with stretch 22 of portion 20, and rotate about a common axis D.

In detail, frame 46 comprises:

two walls 47*a*, 47*b* lying on respective planes orthogonal to direction A; and a pair of support elements 48*a*, 48*b*, which protrude from wall 47*b* towards motor 44 and which rotatably support rollers 51 eccentrically about axis B.

Walls 47*a*, 47*b* are connected to one another.

Support elements 48*a*, 48*b* are staggered parallel to axis B.

In particular, wall 47*b* is arranged downstream of wall 47*a*, proceeding along direction A according to the advancing sense of web 3.

Side 5*a* is the upper side of web 3 and side 5*b* is the lower side of web 3, in the embodiment shown.

Rollers 51 selectively rotate eccentrically about axis B between:

a first position (shown in FIGS. 2 and 5), at which they are tangent to the plane of web 3, and therefore leave stretch 22 coplanar with the remaining part of web 3 and substantially do not exert any action on stretch 22 of web 3; and a second position (shown in FIGS. 3 and 6), at which they extend partly beyond the plane of stretches 21, 23 of web 3, and therefore interfere with stretch 22 and press stretch 22 towards rollers 52, 53.

Figure 3:
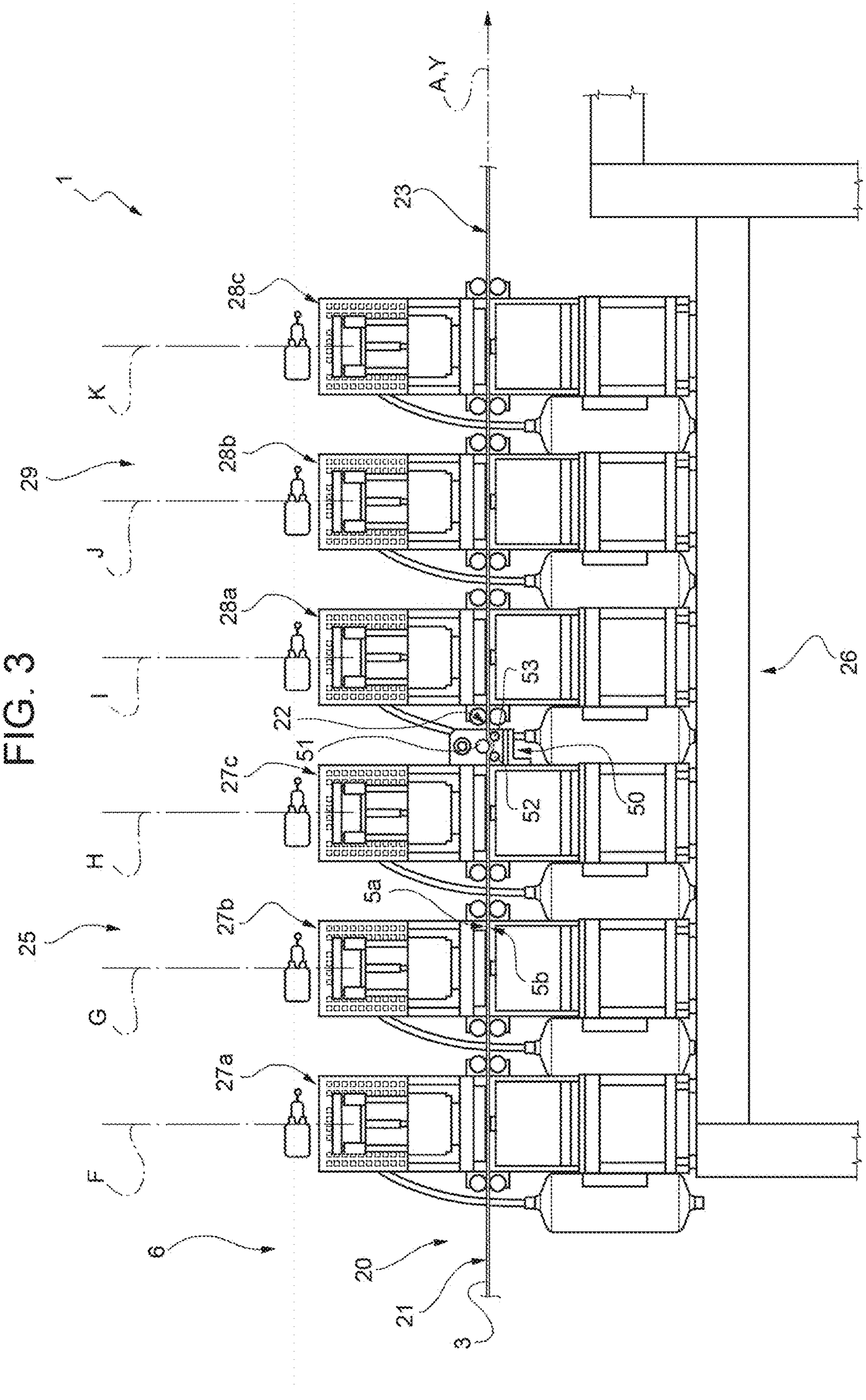
FIG. 3 shows a frontal view of the unit of FIG. 1, with the feeding group in a second position.
Figure 4:
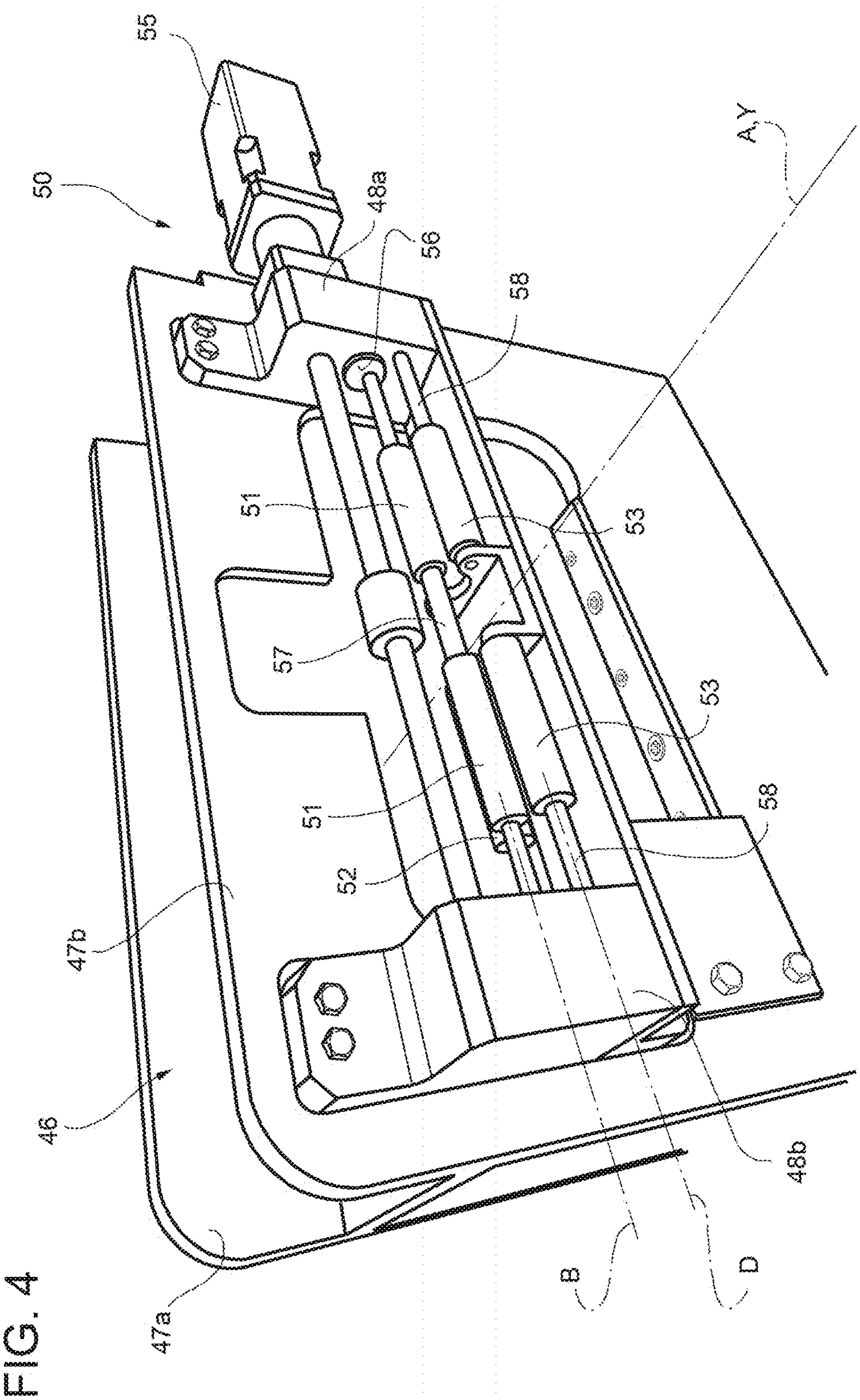
FIG. 4 is a perspective enlarged view of some components of the feeding group of FIGS. 1 to 3.

As shown in FIGS. 3 and 6, when rollers 51 are set in the second position, stretch 22 forms a loop 80 housed inside a room 81. Room 81 is interposed between rollers 52, 53 along direction A and extends on side 5*b* of web 3.

As a result, when rollers 51 are set in the second position, stretch 21 of portion 20 of web 3 with pre-laminated holes 2*a*, 2*b*, 2*c* is dragged towards motor 44, thus recovering offset X up to reach the position shown in FIG. 6.

On the contrary, when rollers 51 are set in the first position, stretch 22 is substantially un-deformed and does not occupy room 81. Accordingly, stretch 21 remains stationary parallel to direction A.

It is important to point out that rollers 51 can selectively assume a plurality of second positions.

For each second position, the extension of loop 80 varies and therefore effective distances between axes G, M measured parallel to direction A of different lengths are recovered.

In the embodiment shown, rollers 51 are arranged above rollers 52, 53.

Furthermore, rollers 52, 53 are idle with respect to respective axes C, D, which are fixed relative to frame 46, and are adapted to counter-support side 5*b* of web 3.

Axes C, D are parallel to each other, parallel to axis B and staggered with respect to direction A.

In particular, axis C is arranged upstream of axis D, proceeding along direction A according to the advancing direction of web 3.

Axis B is interposed between axes C, D, proceeding along direction A according to the advancing direction of web 3

Axes C, D define a plane, horizontal in the embodiment shown, and parallel to direction A.

Axis B and axes C, D are arranged on opposite sides 5*a*, 5*b* of web 3.

Rollers 51, 52, 53 are spaced from each other along respective axes B, C, D.

Actuator 50 substantially comprises (FIG. 4):

a motor 55 controllable on the basis of offset X to be recovered;

a pin 56 of axis B, rotatably supported inside support element 48*a* and driven in rotation about axis B by motor 55; and a shaft 57 parallel to axis B, to which are idly fitted rollers 51 and eccentrically supported by pin 56 with respect to axis B.

In particular, rollers 51 are rotatably mounted in an idle way on shaft 57 about their own axes parallel to and distinct from axis B, by not-shown bearings.

In the very same way, each roller 52, 53 is rotatable mounted in an idle way on a relative shaft 58 and about respective axis C, D, by not-shown bearings.

Unit 1 also comprises a control unit 30 (only schematically shown in FIG. 7) which receives measure signals M2 from sensor 15 and generates control signal S1 for motor 55.

Furthermore, control unit 30 receives measure signal M5' from sensor 100 and generates control signal S2 for motor 44.

In particular, control unit 30 has stored in memory the desired injection positions of pre-laminated holes 2*a*, 2*b*, 2*c*, with respect to moulds 27*a*, 27*b*, 27*c* and evaluates offset X, i.e. the distance along direction A between the real detected positions of pre-laminated holes 2*a*, 2*b*, 2*c* and the position at which they should be to arrive in the respective desired injection positions, once web 3 is arrested.

Control unit 30 is configured to generate control signal S1 for motor 55 on the basis of measured signal M2 and once web 3 has been arrested by device 16.

Control signal S1 for motor 55 results in the rotation of rollers 51 eccentrically about axis B in the second position, so as to press stretch 22 towards rollers 52, 53 and form loop 80, which is housed in room 81.

Accordingly, stretch 21 only of each portion 20 is moved, dragged in the embodiment shown, along direction A and towards motor 44 for a distance, which is necessary to render axes M, G coincident and, therefore, to arrange pre-laminated hole 2*b* exactly in the desired injection position.

In this way, the operation of actuator 50 recovers offset X of pre-laminated holes 2*a*, 2*b*, 2*c* and renders axes M, G coincident to one another.

Furthermore, control unit 30 is configured to generate control signal S2 for motor 44 on the basis of measured signal M5' detected by sensor 100.

In particular, control signal S2 for motor 44 causes the web 3 to be arrested in a position at which axis P of pre-laminated hole 2*e*, coincide with axis J of moulds 28*b*.

In this way, pre-laminated hole 2*e*, is arranged in respective desired injection position with axes J, P coincident.

Furthermore, the distances between axes I, K of pre-laminated holes 2*d*, 2*f*, and relative axes O, Q of moulds 28*d*, 28*f* equal the inevitable tolerance errors existing between axes I, J and k, J respectively.

The operation of feeding group 6 and of unit 1 will be hereinafter described with reference to only one portion 20 and to the relative pre-laminated holes 2*a*, 2*b*, 2*c*, 2*d*, 2*e*, 2*f*, and corresponding magnetic markers C1, C2, C3, C4, C5, C6.

Figure 2:
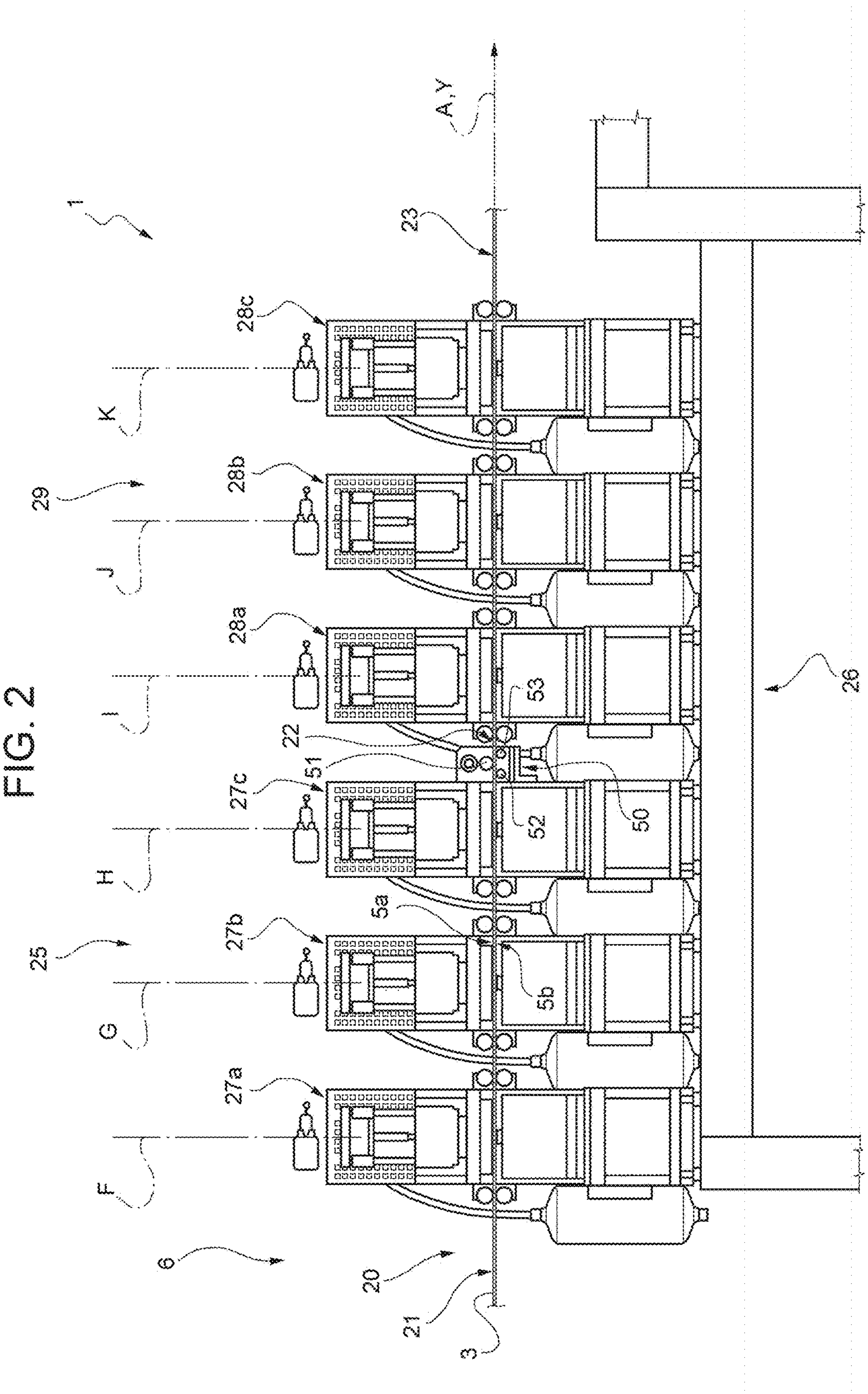
FIG. 2 shows a frontal view of the unit of FIG. 1, with a feeding group in a first position.

The operation of feeding group 6 will be furthermore described starting from a situation, at which rollers 51 are in the first positions and, therefore, do not press stretch 22 inside room 81 (FIGS. 2 and 5).

Web 3 provided with pre-laminated holes 2*a*, 2*b*, 2*c*, 2*d*, 2*e*, 2*f*, and magnetic markers C1, C2, C3, C4, C5, C6 is wound off from reel along path Y.

In particular, pre-laminated holes 2*a*, 2*b*, 2*c*, 2*d*, 2*e*, 2*f*, are equi-spaced along direction A.

Motor 44 of device 16 stepwise and horizontally advances web 3 along direction A and up to arrange portion 20 below moulding station 26, while tensioning device 10 provides web 3 with the correct level of tension.

As web 3 advances along direction A, side 5*a* of web 3 causes the idle rotation of rollers 51 about their own axis, which is distinct from and parallel to axis B. Furthermore, rollers 52, 53 supports side 5*b* of web 3 and are rotated, by web 3, about respective axes C, D.

Sensor 15 detects the presence of magnetic markers C1, C2, C3, C4, C5, C6 and generates measure signals M1, M2, M3, M4, M5, M6 which are associated to the real position of pre-laminated holes 2*a*, 2*b*, 2*c*, 2*d*, 2*e*, 2*f* upstream of moulding station 26.

In the very same way, sensor 100 detects the presence of magnetic markers C1, C2, C3, C4, C5, C6 and generates measure signals M1', M2', M3', M4', M5', M6'. which are associated to the real position of pre-laminated holes 2*a*, 2*b*, 2*c*, 2*d*, 2*e*, 2*f*, between moulds 28*a*, 28*b*.

Control unit 30 receives measured signal M5' associated to the real-position of axis P of pre-laminated hole 2*e*; evaluates the difference between the real position of axis P and the desired injection position coincident with axis J, and generates control signal S2 for motor 44.

In particular, motor 44 stops web 3 in a position (FIG. 5), at which axis P of pre-laminated hole 2*e* substantially coincides with axis J of mould 28*e*, i.e. substantially in the desired injection position of pre-laminated hole 2*e*.

The positions of pre-laminated holes 2*d*, 2*f*, of stretch 23 when web 3 is arrested are determined by the desired injection position of pre-laminated hole 2*e*.

In particular, the distance between axis O of pre-laminated hole 2*d* and axis I of mould 28*a* equals the inevitable tolerance error existing between axes O, P of respective pre-laminated holes 2*d*, 2*e*.

In the very same way, the distance between axis Q of pre-laminated hole 2*f*, and axis K of mould 28*c* equals the inevitable tolerance error existing between axes Q, P of respective pre-laminated holes 2*f*, 2*e*.

Furthermore, when motor 44 has arrested web 3 (FIG. 5), pre-laminated holes 2*a*, 2*b*, 2*c* of stretch 21 are arranged with an intentional offset X with respect to desired injection positions. This is due to the fact that the difference between lengths e and d equals offset X.

On the contrary, pre-laminated holes 2*d*, 2*e*, 2*f*, of stretch 23 are arranged with no intentional offset with respect to the desired injection position.

Still more precisely, proceeding parallel to direction A, axis L (M, N) of pre-laminated hole 2*a* (2*b*, 2*c*) is arranged upstream of axis F (G, H) of mould 27*a* (27*b*, 27*c*), as shown in FIG. 5.

At this stage, control unit 30 receives measured signal M2 associated to the real position of pre-laminated holes 2*b*; evaluates the difference between the real position and the desired injection position of pre-laminated hole 2*b*, and generates control signal S1 for motor 55.

In particular, motor 55 rotates rollers 51 eccentrically about axis B for a given angle associated to control signal S1.

More precisely, motor 55 drives rollers 51 in the second position, shown in FIGS. 2 and 5.

Due to the fact that they rotate eccentrically about axis B, rollers 51, when set in the second position, press stretch 22 towards rollers 52, 53.

Still more precisely, due to the rotation of rollers 51, stretch 22 forms loop 80 which occupies room 81 (FIG. 5).

As a result, stretch 21 is dragged towards motor 44 whereas stretch 23 remains fixed.

In this way, offset X of pre-laminated holes 2*a*, 2*b*, 2*c* is recovered.

Furthermore, pre-laminated hole 2*b* is arranged in the desired injection position, with axis M, G substantially coincident with one another.

The dragging of stretch 21 also determines the position of axes L, N of pre-laminated holes 2*a*, 2*c* with respect to corresponding axes F, H of respective moulds 27*a*, 27*c*.

Still more precisely, the positions of pre-laminated holes 2*a*, 2*c* of stretch 21 when rollers 51 reach the second position, is determined by the position of pre-laminated hole 2*e*.

In particular, the distance between axis L of pre-laminated hole 2*a* and axis F of mould 27*a*, equals the inevitable tolerance error existing between axes L, M of respective pre-laminated holes 2*a*, 2*b*.

In the very same way, the distance between axis N of pre-laminated hole 2*c* and axis H of mould 27*c* equals the inevitable tolerance error existing between axes N, M of respective pre-laminated holes 2*c*, 2*b*.

At this stage, moulds 27*a*, 27*b*, 27*c*, 27*d*, 27*e*, 27*f* inject opening devices 4 on respective pre-laminated holes 2*a*, 2*b*, 2*c*, 2*d*, 2*e*, 2*f*, and about respective axes F, G, H, I, J, K.

Afterwards, motor 55 rotates back rollers 51 in the first position (FIGS. 2 and 5), and web 3 is advanced, so as to arrange a new portion 20 below moulding station 26.

The advantages of feeding group 6 and of the method according to the present invention will be clear from the foregoing description.

In particular, devices 10, 16 are controllable to arrest web 3 in a position, at which pre-laminated holes 2*a*, 2*b*, 2*c* are offset by respective desired injection position; and actuator 50 moves web 3, so as to recover offset X and arrange pre-laminated hole 2*b* in the desired injection position.

In particular, in the above-identified arrest position, the difference between length e and length d equals offset X.

In this way, it is possible to ensure that, when moulding injection is carried out, pre-laminated hole 2*b* is in the desired injection position and that pre-laminated holes 2*a*, 2*c* are spaced from respective injected position only by the inevitable tolerance errors in the distances between axes L, M and M, N respectively.

Moreover, actuator 50 moves pre-laminated holes 2*a*, 2*b*, 2*c* without moving pre-laminated holes 2*d*, 2*e*, 2*f*.

Accordingly, the tolerance chain formed by the tolerance errors in the distances between axes L, M and M, N of pre-laminated holes 2*a*, 2*b* and 2*b*, 2*c* is made completely independent of the tolerance chain formed by tolerance errors in the distances between axes O, P and P, Q of pre-laminated holes 2*d*, 2*e*, and 2*e*, 2*f*.

Therefore, feeding group 6 can feed moulding station with both pre-laminated holes 2*a*, 2*b*, 2*c* and pre-laminated holes 2*d*, 2*e*, 2*f*, without lengthening the tolerance errors chain and, therefore, without penalizing the precision of the positioning of pre-laminated holes 2*a*, 2*b*, 2*c*, 2*d*, 2*e*, 2*f*, with respect to respective moulds 27*a*, 27*b*, 27*c*, 28*a*, 28*b*, 28*c*.

The feeding rate of feeding group 6 is therefore enhanced, without penalizing the precision of the positioning of pre-laminated holes 2*a*, 2*b*, 2*c*, 2*d*, 2*e*, 2*f*.

Furthermore, actuator 50 comprises rollers 51, which rotate eccentrically about axis B from the first position at which are tangent to advancing web 3 to the second position at which they press stretch 22 of arrested web 3 in room 81 so as to recover offset X.

Accordingly, rollers 51 efficiently recover offset X when set in the second position without damaging web 3 when set in the first position.

Clearly, changes may be made to feeding group 6 and to the method without, however, departing from the protective scope defined in the accompanying claims.

In particular, unit 1 could comprise at least two tools different from moulds 27*a*, 27*b*, 27*c*; 28*a*, 28*b*, 28*c* which carries out different operation from moulding injection of opening devices 4 on respective areas of web 3 different from pre-laminated holes 2*a*, 2*b*, 2*c*; actuator 50 being interposed along direction A between those two tools.

Furthermore, actuator 50 could be a linear push element, which can be selectively moved in a position at which pushes stretch 22 of web 3 inside room 81.

Markers C1, C2, C3, C4, C5, C6 could be not magnetic. For example, they could be formed by respective optically-readable printed marks.

Finally, length e could be smaller than length d and offset X could be equal to d-e.

The invention claimed is:

1. A unit for carrying out a first molding operation and a second molding operation respectively onto a first area and a second area of a packaging material, the packaging material comprising a base layer and lamination layers;

said first area and said second area being spaced for a first distance along a direction when a portion of said packaging material comprising said first area and said second area is flat, said first area comprising a pre-laminated hole and said second area comprising a pre-laminated hole, the pre-laminated hole in the first area and the pre-laminated hole in the second area being a through hole in the base layer that is covered by the lamination layers;

said unit comprising:

a feeding group for feeding a web of said packaging material along the direction and in a first sense;

at least one first molding tool configured to carry out said first molding operation on the pre-laminated hole in said first area arranged in a first desired position to mold an opening device at the pre-laminated hole in the first area;

at least one second molding tool configured to carry out said second molding operation on the pre-laminated hole in said second area arranged in a second desired position to mold an opening device at the pre-laminated hole in the second area;

said first molding tool and said second molding tool being spaced for a second distance along said direction;

wherein said feeding group comprises:

advancing means controllable to arrest said web in a position, at which said second area is spaced for an intentional offset from said second desired position; and actuating means controllable for moving said second area towards said second desired position, so as to recover said offset;

the absolute value of the difference between said first distance and said second distance being equal to said offset.

2. The unit of claim 1, wherein said actuating means are controllable to move said second area towards said second desired position, parallel to said direction and in said first sense.

3. The unit of claim 1, wherein said advancing means are controllable to arrest said first area in said first desired position; and in that said actuating means are controllable to substantially leave said first area in said first desired position.

4. The unit of claim 1, wherein said actuating means comprise at least one moving member, which may move between:

a first position, at which it does not interact with said web; and a second position, at which it presses said web so as to move said second area towards said second desired position, when said web has been arrested by said advancing means.

5. The unit of claim 4, wherein said moving member is a rotating member that rotates eccentrically about a first axis between said first position and said second position;

said actuating means comprising at least a pair of rollers arranged, in use, on the opposite side of said rotating member with respect to said web and adapted to counter-support said web against said rotating member;

said rollers having respective second axes paced along said direction;

said first axis being interposed between said second axes, so that the eccentric rotation of said rotating member presses a portion of said web in a room defined between said second axes and arranged on the opposite side of said web with respect to said rotating member.

6. The unit of claim 1, comprising sensing means for generating a signal associated to the real position of said second area; said actuating means being controllable on the basis of said signal to move said second area towards said second desired position.

7. The unit of claim 1, wherein said actuating means are arranged downstream of said second tool and upstream of said first tool, proceeding along said direction according to said first sense.

8. The unit of claim 1, wherein said first tool is a first applicator for applying a first opening device onto said first area and in said first desired position, and in that said second tool is a second applicator for applying a second opening device onto said second area.

9. A method for carrying out a first molding operation and a second molding operation respectively onto a first area and a second area of a packaging material, the packaging material comprising a base layer and lamination layers;

said first area and said second area being spaced for a first distance along a direction when a portion of said packaging material comprising said first area and said second area is flat, said first area comprising a pre-laminated hole and said second area comprising a pre-laminated hole, the pre-laminated hole in the first area and the pre-laminated hold in the second area being a through hole in the base layer that is covered by the lamination layers;

said method comprising:

feeding a web of said packaging material along the direction and in a first sense;

carrying out said first molding operation on the pre-laminated hole in said first area and at a first desired position to mold an opening device at the pre-laminated hole in the first area, by using at least one first molding tool; and carrying out said second molding operation on the pre-laminated hold in said second area and at a second desired position to mold an opening device at the pre-laminated hole in the second area, by using at least one second molding tool;

said first and said second tool being spaced for a second distance along the direction;

wherein said step of feeding the web of packaging material comprises:

arresting said web in a position, at which said second area is spaced by an intentional offset from said second desired position; and moving said second area towards said second desired position, so as to recover said offset;

the absolute value of the difference between said first distance (e) and said second distance being equal to said offset.

10. The method of claim 9, wherein said step of moving comprises the step of dragging said second area in said first sense and along said direction.

11. The method of claim 9, wherein said step of feeding comprises the step of arresting said first area in said first desired position; and in that said step of moving said second area comprises the step of substantially leaving said first area in said first desired position.

12. The method of claim 10, wherein said step of dragging comprises the steps of:

pressing a portion of said web interposed between said first area and said second area, by moving a movable element between a first position, at which said movable element does not interact with said web, and a second position, at which movable element presses said web.

13. The method of claim 12, wherein said step of dragging comprises the step of eccentrically rotating said movable element about a first axis and between said first position and said second position; the method further comprising the step of:

supporting said portion of said web, by using a pair of rollers rotatable about respective second axes, spaced along said direction, and arranged on the opposite side of said movable element with respect to said web, said step of pressing comprising the step of forcing said portion in a room defined between said second axes and arranged on the opposite side of said web with respect to said element.

14. The method of claim 9, comprising the steps of:

carrying out a plurality of said second operations on respective said second areas, by using a plurality of respective said second tools;

arranging, during said step of moving, one (2*b*) of said second areas in respective said second desired position; and arranging, during said step of moving, the others of said second areas in respective positions determined by said desired position of said one (2*b*) of said second areas.

15. The method of claim 9, wherein said step of carrying out said first operation on said first area comprises the step of applying a first opening device on said first area, and in that said step of carrying out said second operation on said second area comprises the step of applying a second opening device on said second area.

16. A unit for carrying out a first molding operation at a first pre-laminated hole in a packaging material web and a second molding operation at a second pre-laminated hole in the packaging material web, the packaging material comprising a base layer and lamination layers, each of the first and second pre-laminated holes being a through hole in the base layer that is covered by the lamination layers, each of the first and second pre-laminated holes possessing an axis, the first and second pre-laminated holes being located in a portion of the packaging material web and being spaced a first distance along a direction when the portion of the packaging material web in which the first and second pre-laminated holes are located is flat, the unit comprising:

a first mold that that carries out the first molding operation at the first pre-laminated hole arranged in a first desired position to produce an opening device at the first pre-laminated hole, the first mold possessing an axis;

a second mold that carries that carries out the second molding operation at the second pre-laminated hole arranged in a second desired position to produce an opening device at the second pre-laminated hole, the second mold possessing an axis;

the first and second molds being spaced a second distance along the direction;

a motor operable to feed the packaging material web along the direction and in a first sense, and to arrest the packaging material web at a position in which the second pre-laminated hole is spaced an intentional offset from the second desired position while the first pre-laminated hole is arranged with no intentional offset with respect to the first desired position;

an actuator configured to act on a portion of the packaging material web to move the second pre-laminated hole towards the second desired position to recover the offset so that the axis of the second pre-laminated hole coincides with the axis of the second mold; and the absolute value of the difference between the first distance and the second distance being equal to the offset.

17. The unit according to claim 16, wherein the actuator includes a plurality of rotatable rollers mounted in a frame, the plurality of rotatable rollers being positioned so that as the packaging material web passes through the actuator, at least one of the plurality of rotatable rollers is on one side of the packaging material web and two of the plurality of rotatable rollers are on an opposite side of the packaging material web.

18. The unit according to claim 17, wherein the at least one rotatable roller is configured to eccentrically rotate.

19. The unit according to claim 18, wherein the at least one rotatable roller is eccentrically rotatable between a first position in which the at least one rotatable roller is tangent to a plane of the packaging material web and a second position in which the at least one rotatable roller presses against the packaging material web to deflect a portion of the packaging material web and produce a loop in the packaging material web.

* * * * *